(12) United States Patent
Pevec et al.

(10) Patent No.: US 12,701,645 B2
(45) Date of Patent: Aug. 4, 2026

(54) ELECTRONIC DEVICE

(71) Applicant: STMicroelectronics International N.V., Geneva (CH)

(72) Inventors: Albin Pevec, Ljubljana (SI); Nejc Suhadolnik, Preserje (SI); Damjan Bercan, Smartno priLitiji (SI); Maksimiljan Stiglic, Maribor (SI)

(73) Assignee: STMicroelectronics International N.V., Geneva (CH)

( * ) Notice: Subject to any disclaimer, the term of this patent is extended or adjusted under 35 U.S.C. 154(b) by 305 days.

(21) Appl. No.: 18/540,286

(22) Filed: Dec. 14, 2023

(65) Prior Publication Data

US 2024/0206039 A1 Jun. 20, 2024

(30) Foreign Application Priority Data

Dec. 20, 2022 (EP) .................................... 22215214

(51) Int. Cl.
*H05B 47/105* (2020.01)
*G06V 40/12* (2022.01)
(Continued)

(52) U.S. Cl.
CPC ....... *H05B 47/105* (2020.01); *G06V 40/1312* (2022.01); *G06V 40/1365* (2022.01); *H05B 47/19* (2020.01); *H05B 47/196* (2024.01)

(58) Field of Classification Search
CPC .. G06Q 20/3574; G06Q 20/02; G06Q 20/202; G06Q 20/204; G06Q 20/227; G06Q 20/322; G06Q 20/3226; G06Q 20/326; G06Q 20/3265; G06Q 20/341; G06Q 20/342; G06Q 20/351; G06Q 20/352; G06Q 20/353; G06Q 20/3552; G06Q 20/3555; G06Q 20/3567; G06Q 20/3572; G06Q 20/363; G06Q 20/367; G06Q 20/385; G06Q 20/387; G06Q 20/40; G06Q 20/401; G06Q 20/4012; G06Q 20/405; G06Q 30/0185; G06Q 30/0215; G06Q 30/0229; G06Q 40/02; H04R 1/04; H04R 1/46; H04R 9/025; H04R 9/045
See application file for complete search history.

(56) References Cited

U.S. PATENT DOCUMENTS 5,198,701 A    3/1993  Davies et al.
12,380,424 B2 *  8/2025  Frollini .............. G06Q 20/3821
(Continued)

FOREIGN PATENT DOCUMENTS

DE    102011122797 A1    12/2012

OTHER PUBLICATIONS

EPO Search Report and Written Opinion for priority application, EP Appl. 22215214.2, report dated May 19, 2023, 7 pgs.

*Primary Examiner* — Monica C King
(74) *Attorney, Agent, or Firm* — Crowe & Dunlevy LLC

(57) ABSTRACT

A device is configured to operate in a first mode of operation during which the device is configured to receive a first supply voltage in a contactless manner. The device includes a light emitting element and a first circuit. The first circuit is configured to receive a second supply voltage generated from the first supply voltage. A first current is generated from the first supply voltage, independent from the second voltage, and applied to the light emitting element which is selectively turned on.

27 Claims, 6 Drawing Sheets

(51) Int. Cl.
    *G06V 40/13*        (2022.01)
    *H05B 47/175*     (2020.01)
    *H05B 47/19*      (2020.01)

(56)           References Cited

U.S. PATENT DOCUMENTS

| | | | |
|---|---|---|---|
| 2002/0014963 A1 | 2/2002 | Trosper | |
| 2005/0173543 A1 | 8/2005 | Ruping et al. | |
| 2007/0046468 A1 | 3/2007 | Davis | |
| 2012/0241524 A1 | 9/2012 | Blot et al. | |
| 2014/0191659 A1 | 7/2014 | Wu | |
| 2014/0364058 A1* | 12/2014 | Chew | G06Q 20/382 |
| | | | 455/41.1 |
| 2014/0365370 A1* | 12/2014 | Huang | G06Q 20/3278 |
| | | | 705/44 |
| 2015/0073983 A1* | 3/2015 | Bartenstein | G06Q 20/325 |
| | | | 705/41 |
| 2015/0118958 A1* | 4/2015 | Jain | G06Q 20/425 |
| | | | 455/41.1 |
| 2015/0348009 A1* | 12/2015 | Brown | G06Q 20/352 |
| | | | 705/16 |
| 2016/0171482 A1* | 6/2016 | Muncey | G06Q 20/204 |
| | | | 705/44 |
| 2018/0039987 A1* | 2/2018 | Molino | G06Q 20/4012 |
| 2019/0172054 A1* | 6/2019 | Muncey | G06Q 20/3226 |
| 2020/0117970 A1* | 4/2020 | Martin-Martinasso | |
| | | | G06K 7/042 |
| 2021/0034726 A1* | 2/2021 | Knausz | G06F 21/32 |
| 2021/0034834 A1* | 2/2021 | Mackin | G07F 7/086 |

* cited by examiner

ELECTRONIC DEVICE

PRIORITY CLAIM

This application claims the priority benefit of European Application for Patent No. 22215214.2, filed on Dec. 20, 2022, the content of which is hereby incorporated by reference in its entirety to the maximum extent allowable by law.

TECHNICAL FIELD

The present disclosure relates generally to electronic devices and, in particular, to dual interface chip cards and their power supplies.

BACKGROUND

A dual-interface chip card has both contact and contactless interfaces. The "contactless" part means it has a Radio-frequency identification (RFID) chip that enables it to make payments through the RFID short-range radio communication. The "contact" part means it can be used with physical readers, either via a traditional magnetic stripe or with a chip that lets it be dipped into an EMV ("Europay, Mastercard, and Visa") reader.

The interface of the card is also responsible for the power supply of the different circuits of the card. Therefore, a dual interface chip card can be powered by the contact interface or by the contactless interface.

However, the power supplies of the card are not adapted to some circuits that may be added on the card.

SUMMARY

One embodiment provides a device configured to operate in a first mode of operation, during which the device is configured to receive a first supply voltage in a contactless manner, the device comprising a light emitting element and a first circuit, the first circuit being configured to receive a second supply voltage generated from the first supply voltage, the light emitting element being configured to receive a first current generated from the first supply voltage and independent from the second voltage.

Another embodiment provides a method of control of a device comprising a first mode of operation, during which the device receives a first supply voltage in a contactless manner, the device comprising a light emitting element and a first circuit, the first circuit receiving a second supply voltage generated from the first supply voltage, the light emitting element receiving a first current generated from the first supply voltage and independent from the second voltage.

According to an embodiment, the light emitting element is a light emitting diode.

According to an embodiment, the first circuit is an authentication circuit.

According to an embodiment, the first circuit is a fingerprint sensor.

According to an embodiment, the light emitting element is configured to indicate the result of an authentication step.

According to an embodiment, the device comprises an antenna configured to generate the first voltage during the first mode of operation.

According to an embodiment, the device comprises an integrated circuit configured to receive the first voltage, the integrated circuit comprising a second circuit configured to generate the second voltage on a first pin of the integrated circuit and a third circuit configured to generate the current on a second pin of the integrated circuit.

According to an embodiment, the device comprises a capacitor coupled between the first pin and a node of application of a reference voltage.

According to an embodiment, the device comprises a generation circuit of a control voltage for the light emitting element, the light emitting element being coupled between the output of the generation circuit and the second pin.

According to an embodiment, the third circuit comprises a rectifier coupled between the first nodes of application of the first voltage and a second node, a first resistance and a first transistor coupled in series between the second node and the second pin.

According to an embodiment, the device comprises at least one assembly of a second resistance, a second transistor and a switch coupled in series, the at least one assembly being coupled in parallel with the first resistance and the first transistor, the switch of the at least one assembly being controlled by a calibration signal.

According to an embodiment, the device comprises a fourth circuit configured to generate the calibration signal based on the comparison of the first current and a reference current.

According to an embodiment, the device is configured to implement a calibration step before every enable of the light emitting element.

According to an embodiment, the device is configured to operate in a second operational mode, during which the device is configured to receive a third supply voltage through contact.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
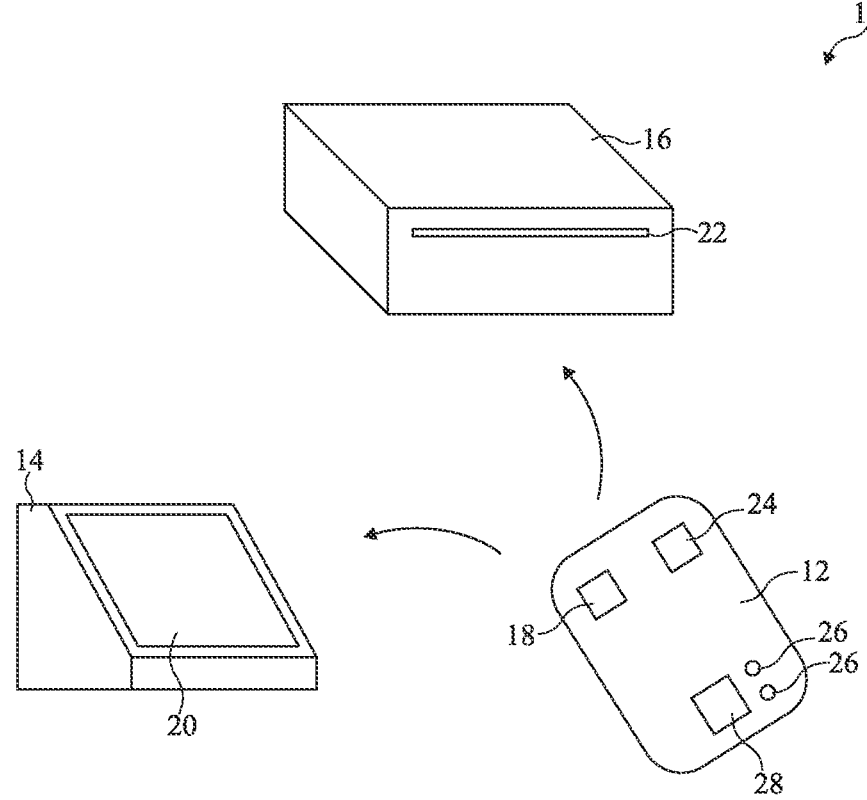
FIG. 1 illustrates an example of application of the embodiments of FIGS. 2 to 7.

FIG. 1 illustrates an example of application of the embodiments of FIGS. 2 to 7. More precisely, FIG. 1 illustrates a payment system 10.

The system 10 comprises a card 12. The card 12 is a personal payment device. The card is, for example, a banking card, for example a debit or a credit card. The card 12 is a dual interface chip card. In other words, the card 12 has both a contact interface and a contactless interface and can operate either in a contact mode or a contactless mode.

The system 10 comprises a device 14, configured to interface in a contactless manner with the card 12, and a device 16 configured to interface in a contact manner with the card 12.

The device 14 is a contactless reader. The device 14 is configured to exchange information with the card without contact between the card and the reader. For example, the exchange is made using Radio-frequency identification (RFID) or any other communication standard. The card 12 and the device 14 respectively comprise antennas 18 and 20, configured to exchange in a contactless manner, for example through RFID.

The device 16 is a contact reader. The device 16 is configured to exchange information with the card 12 while there is contact between the card and the reader 16. For example, the device 16 comprises an opening 22 where the card 12 can be inserted to put a part 24 of the card 12 in contact with an internal element of the device 16.

The card 12 comprises at least one light emitting element 26, for example a light emitting diode (LED). In the example of FIG. 1, the card 12 comprises two LEDs 26. In the example of FIG. 1, the LEDs 26 are configured to indicate the result of a step of authentication of the user. The card 12 comprises, for example, a LED of a first color, for example green, which is illuminated in order to indicate the success of the identification and a LED of a second color, for example red, which is illuminated in order to indicate the failure of the identification.

The authentication is, for example, made by a fingerprint sensor 28 configured to compare the fingerprint of the user to a known image of a fingerprint.

Alternatively, the light emitting elements can be configured to indicate other information regarding the card or the connection between the card and the reader 14 or 16. For example, the light emitting elements 26 can indicate if the connection has been made between the card and the reader.

Figure 2:
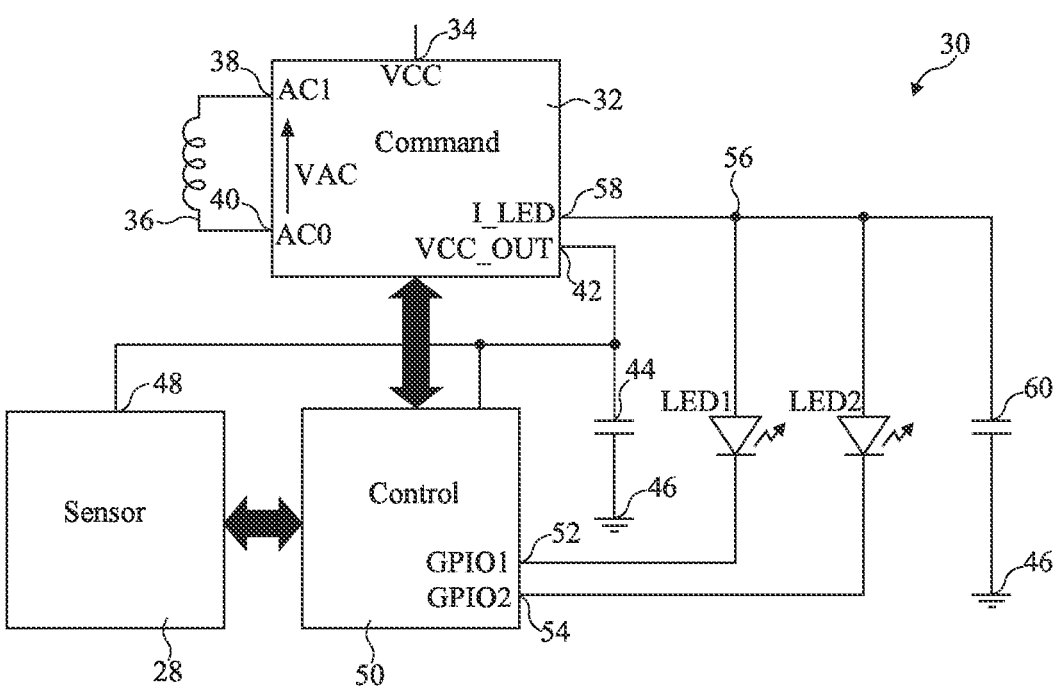
FIG. 2 illustrates an embodiment of a circuit of the device of FIG. 1.

FIG. 2 illustrates an embodiment of a circuit of the device of FIG. 1. More precisely, FIG. 2 illustrates an embodiment of a circuit 30 of the card 12.

The circuit 30 comprises a command circuit 32. The circuit 32 is, for example, a controller or a microcontroller, preferably a secure controller preferably a dual interface secure controller. The circuit 32 is, for example, an integrated circuit.

The circuit 32 comprises an input 34 coupled to the element 24 of FIG. 1, in other words the element allowing a contact interface between the card and the contact reader 16. The input 34 is configured to receive a supply voltage VCC, for example a DC voltage, from the contact reader 16 when the card is used in a contact mode.

The circuit 30 comprises an antenna 36. The antenna 36 comprises a first terminal coupled to an input/output node 38 of the circuit 32. The antenna 36 comprises a second terminal coupled to an input/output node 40 of the circuit 32. The antenna 36 is, for example, configured to receive an AC voltage VAC between the nodes 38 and 40. The node 38 receives, for example, a potential AC1 and the node 40 receives, for example, a potential AC0. The antenna 36 is configured to receive and emit information when the card is used in a contactless mode.

The circuit 32 is configured to generate a supply voltage VCC_OUT, used to power several elements of the circuit 30. The circuit 32 comprises an output node 42 on which is applied the voltage VCC_OUT. The voltage VCC_OUT is more precisely applied between the terminals of a capacitor 44. The capacitor 44 is coupled between the node 42 and a node 46 of application of a reference voltage, for example the ground GND. In other words, a terminal of the capacitor 44 is coupled, preferably connected, to the node 42 and another terminal of the capacitor 44 is coupled, preferably connected, to the node 46.

The circuit 30 comprises an authentication circuit, more precisely, in the example of FIG. 2, the fingerprint sensor 28. The sensor 28 is powered by the circuit 22. More precisely, the sensor 28 is powered by the voltage VCC_OUT. In other words, the sensor comprises a power supply node 48 coupled, preferably connected, to the node 42.

The circuit 30 comprises two light emitting elements LED1 and LED2, for example light emitting diodes, corresponding to the LEDS 26 of FIG. 1. The elements LED1 and LED2 are controlled by a circuit 50.

The circuit 50 is, for example, a controller, for example a high performance standard controller. The circuit 50 is, for example, a non-secure controller. The circuit 50 is, for example, powered by the circuit 32. For example, the circuit 50 is powered by the voltage VCC_OUT. In other words, the circuit 50 comprises a power supply input coupled, preferably connected, to the node 42.

The circuit 50 is configured to generate control voltages GPIO1 and GPIO2, respectively on command nodes 52 and 54 for the diodes LED1 and LED2. For example, each diode LED1 and LED2 is coupled between a node 56 and the corresponding command node. In other words, the element LED1 is coupled between the nodes 56 and 52 and the element LED2 is coupled between the nodes 56 and 54. More precisely, a terminal of the element LED1, for example the anode, is coupled, preferably connected, to the node 56 and another terminal of the element LED1, for example the cathode, is coupled, preferably connected, to the node 52. A terminal of the element LED2, for example the anode, is coupled, preferably connected, to the node 56 and another terminal of the element LED2, for example the cathode, is coupled, preferably connected, to the node 54.

The elements LED1 and LED2 are both powered by a current I_LED. The elements LED1 and LED2 are preferably powered by the same current I_LED. The elements LED1 and LED2 are not powered by the voltage VCC_OUT. The current I_LED is preferably generated by the circuit 32.

The current I_LED is preferably generated by the circuit 32 on a node 58 of the circuit 32. The node 58 is coupled, preferably connected, to the node 56.

The output node 58 is distinct from the output node 42. Preferably, the output node 58 corresponds to a pin of the integrated circuit 32 and the output node 42 corresponds to another, distinct, pin of the integrated circuit 32. Preferably, the current I-LED, more particularly the variation of the current I_LED, are independent of the voltage VCC_OUT, more particularly the variation of the voltage VCC_OUT. In other words, the voltage VCC_OUT is preferably independent from the state of the elements LED1 and LED2. For example, the current I_LED is generated by circuit block of the circuit 32 different from the circuit block configured to generate the voltage VCC_OUT.

As the current I_LED is independent from the voltage VCC_OUT, it is possible to modify the value of the current I_LED, for example to adapt to different type of diodes, without disturbing the supply voltage VCC_OUT and without disturbing the communication of the card with the reader.

During the operation of the card, for example during a payment operation, the card is associated with a reader device. If the reader device is a contactless reader, the circuit 32 is powered by the voltage VAC received between the nodes 38 and 40. The node 34 receives no voltage. If the reader device is a contact reader, the circuit 32 is powered by the voltage VCC received on the node 34. The nodes 38 and 40, for example, receive no voltage. The voltage VCC_OUT is generated based on the power supply of the circuit 32, either the voltage VCC or the voltage VAC, depending on the mode of interface.

In order to protect the operation, for example the payment, done by the card, an authentication of the user by fingerprint might be needed. For example, the authentication is used for all operations of the card, when interacting with a reader. Alternatively, the circuit 30 can, depending for example on information obtained from the reader, determine if an authentication is needed.

If the authentication is needed, the circuit 32 commands the circuit 50 to perform a fingerprint acquisition. The circuit 50 enables the sensor 28. Once the acquisition is done, the data generated by the acquisition is provided to the circuit 50. The circuit 50 compares the data to known data stored in a memory, in order to authenticate the user. The circuit 32 does not have, in some applications, the computing power to process the data generated by the sensor 28. The circuit 50 determines, according to the result of the authentication, which element LED1 or LED2 is to be turned on and therefore the voltages GPIO1 and GPIO2 to provide on the nodes 52 and 54.

The circuit 30 further comprises, for example, a capacitor 60 CLED. The capacitor 60 is coupled between the node 56 and a node of application of a reference voltage, for example the node 46. The capacitor allows the smoothing of the voltage applied between the terminals of the elements LED1 and LED2.

According to another embodiment, the circuit 30 does not comprise the circuit 50, all features of the circuit 50 being implemented by the circuit 32. In this embodiment, the nodes 52 and 54 are pins from the circuit 32.

Figure 3:
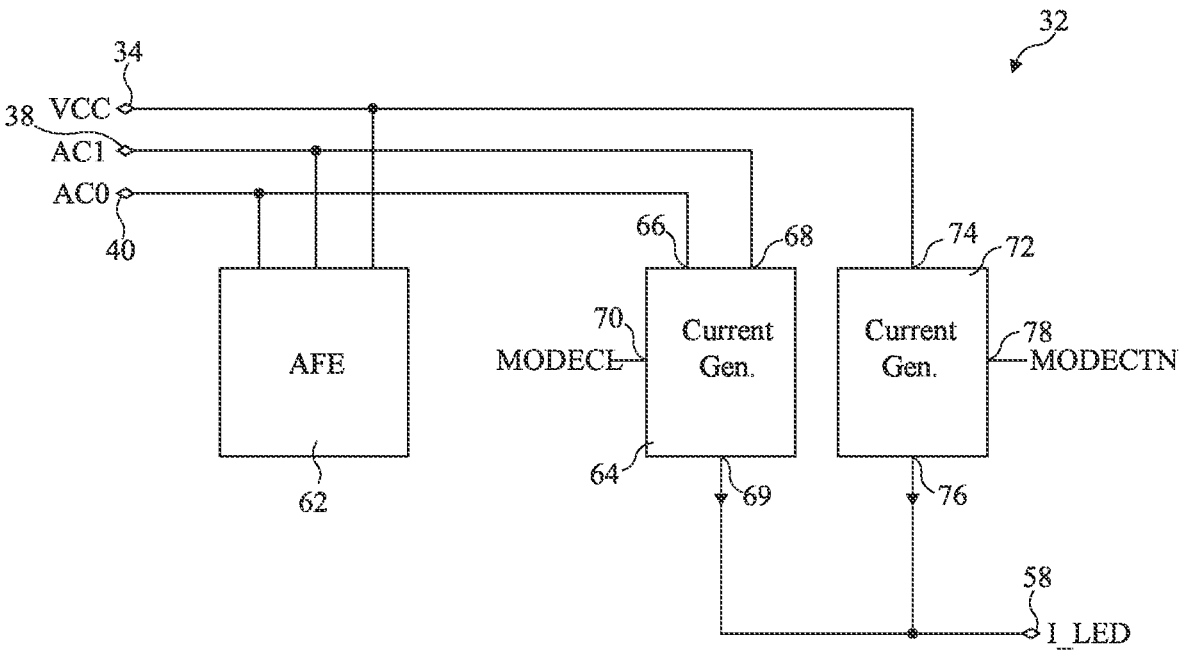
FIG. 3 illustrates in more detail part of the embodiment of FIG. 2.

FIG. 3 illustrates in more detail part of the embodiment of FIG. 2. More precisely, FIG. 3 represents schematically part of the circuit 32 of FIG. 2.

FIG. 3 represents: the node 34, receiving the supply voltage VCC when the card is communicating with a contact reader; the node 38, receiving the potential AC1 when the card is communicating with a contactless reader; the node 40, receiving the potential AC0 when the card is communicating with a contactless reader; and the node 58 on which is provided the current I_LED.

The circuit 32 comprises, for example, an analog front end (AFE) circuit 62. The circuit 62 is, for example, coupled to the nodes 34, 38 and 40.

The circuit 32 comprises a circuit 64 of generation of the current I_LED when the card in powered in a contactless manner, in other words when the card is associated with a contactless reader. The circuit 64 is configured to receive the voltage VAC, in other words the potential AC1 and AC0. In other words, the circuit 64 comprises input nodes 66 and 68, respectively coupled, preferably connected, to the nodes 40 and 38. The circuit 64 further comprises an output node 69 coupled, preferably connected, to the node 58.

The circuit 64 further comprises an input 70 configured to receive a control signal MODECL. The control signal MODECL is, for example, generated by the circuit 62. The control signal MODECL indicates to the circuit 64 whether the card is associated to a contactless reader or not. In other words, the control signal MODECL indicates to the circuit 64 whether it is responsible of the generation of the current I_LED or not.

The circuit 32 comprises, for example, a circuit 72 of generation of the current I_LED when the card in powered in a contact manner, in other words when the card is associated with a contact reader. The circuit 72 is configured to receive the voltage VCC. In other words, the circuit 64 comprises input node 74 coupled, preferably connected, to the node 34. The circuit 72 further comprises an output node 76 coupled, preferably connected, to the node 58.

The circuit 72 further comprises an input 78 configured to receive a control signal MODECNT. The control signal MODECNT is, for example, generated by the circuit 62. The control signal MODECNT indicates to the circuit 72 whether the card is associated to a contact reader or not. In other words, the control signal MODECNT indicates to the circuit 72 whether it is responsible of the generation of the current I_LED or not.

Figure 4:
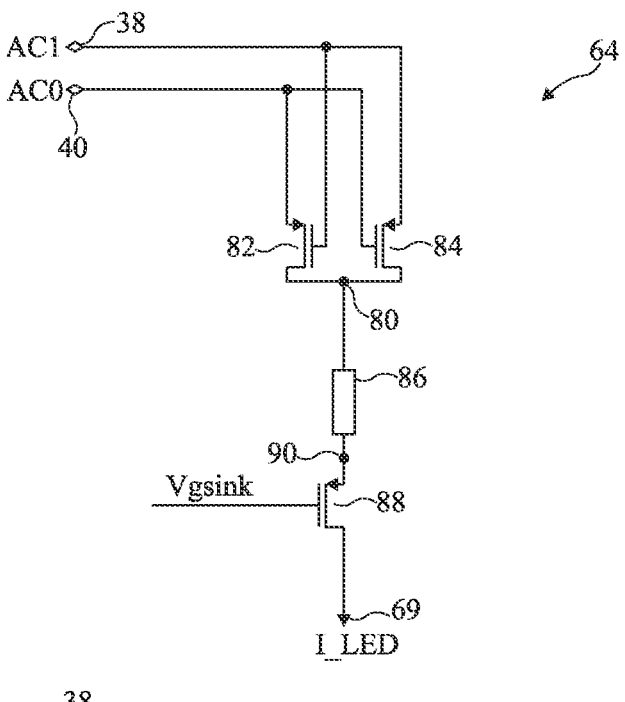
FIG. 4 illustrates in more detail part of the embodiment of FIG. 3.

FIG. 4 illustrates in more detail part of the embodiment of FIG. 3. More precisely, FIG. 4 represents, schematically, an embodiment of the circuit 64 of FIG. 3. In other words, FIG. 4 represents, schematically, an embodiment of a generation circuit of the current I_LED in contactless supply mode.

The circuit 64 comprises: the node 38, receiving the potential AC1 when the card is communicating with a contactless reader; the node 40, receiving the potential AC0 when the card is communicating with a contactless reader; and the node 69 on which is provided the current I_LED.

The peak voltage of the antenna is, for example, determined by a limiter circuit, for example a clamp circuit, not represented in FIG. 4.

The circuit 64 comprises a rectifier circuit coupled between the nodes 38 and 40 and a node 80. The rectifier is configured to generate positive halfwave of the voltage VAC on the node 80.

The rectifier comprises, in the example of FIG. 4, a transistor 82 and a transistor 84. The transistors 82 and 84 are, for example, Metal Oxide Semiconductor Field Effect Transistors (MOSFET). The transistors 82 and 84 are, for example, p-channel transistors. The transistor 82 is coupled between the node 40 and the node 80 and the transistor 84 is coupled between the node 38 and the node 80. In other words, a terminal of the transistor 82, for example the source, is coupled, preferably connected, to the node 40 and another terminal, for example the drain, of the transistor 82 is coupled, preferably connected, to the node 80. Similarly, a terminal of the transistor 84, for example the source, is coupled, preferably connected, to the node 38 and another terminal, for example the drain, of the transistor 84 is coupled, preferably connected, to the node 80. A control terminal, for example the gate, of the transistor 82 is coupled, preferably connected, to the node 38 and a control terminal, for example the gate, of the transistor 84 is coupled, preferably connected, to the node 40.

The circuit 64 further comprises a cascade stage comprising a resistance 86 and a transistor 88. The resistance 86 and the transistor 88 are coupled in series between the node 80 and the node 69. In other words, a terminal of the resistor 86 is coupled, preferably connected, to the node 80 and another terminal of the resistance 86 is coupled, preferably connected, to a node 90. A terminal of the transistor 88, for example the source, is coupled, preferably connected, to the node 90 and another terminal of the transistor 88, for example the drain, is coupled, preferably connected, to the node 69. The transistor 88 is controlled by a control voltage Vgsink. A control terminal, for example the gate, of the transistor 88 is therefore coupled, preferably connected, to a node of application of the voltage Vgsink.

The current I_LED is provided in form of pulses having frequency equal to twice the frequency of the voltage VAC. If the elements LED1 and LED2 are configured to receive a direct current, the current is, for example, smoothed by the capacitor 60 of FIG. 2.

The peak value of the current I_LED is substantially equal to (Vp−Vgsink−Vth)/R, where Vp is limiter voltage, in other words the peak value of the voltage VAC, defined by the limiter, Vth is the threshold value of the transistor 88 and R is the resistance value of the resistor 86. The average value of the current I_LED is, for example, equal to the peak value of the current I_LED divided by a value comprised between 3 and 3.5.

The circuit 64 is configured so that, when the voltage VAC is below the limiter voltage Vp, which will happen when the electromagnetic field of the contactless reader is low or when data are being transmitted between the card and the reader, the current I_LED is reduced. However, the transmission is not disturbed. When the voltage VAC drops below the sum of the values Vp and Vgsink, the current I_LED is substantially equal to zero, and the elements LED1 and LED2 are no longer supplied in order to prioritize the emission and reception of data. The durations during which the elements LED1 and LED2 are no longer supplied are generally of a few microseconds, and are therefore not visible.

Figure 5:
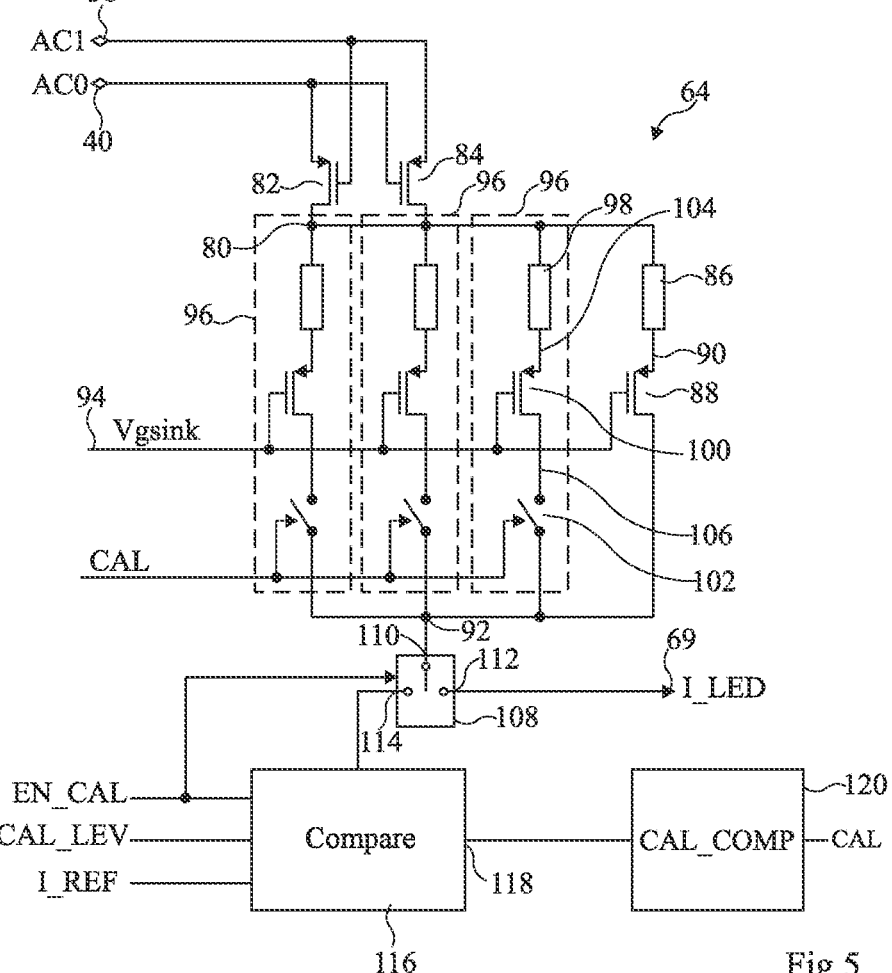
FIG. 5 illustrates an alternative of the embodiment of FIG. 4.

FIG. 5 illustrates an alternative of the embodiment of FIG. 4. More precisely, FIG. 5 represents, schematically, another embodiment of the circuit 64 of FIG. 3. In other words, FIG. 5 represents, schematically, another embodiment of a generation circuit of the current I_LED in contactless supply mode.

In the example of FIG. 5, the circuit 64 comprises, as in FIG. 4: the node 38, receiving the potential AC1 when the card is communicating with a contactless reader; the node 40, receiving the potential AC0 when the card is communicating with a contactless reader; the node 69 on which is provided the current I_LED; the transistors 82 and 84, coupled, as described in relation with FIG. 4, to the nodes 38, 40 and 80; and the resistor 86 and the transistor 88; the node 38, receiving the potential AC1 when the card is communicating with a contactless reader; the node 40, receiving the potential AC0 when the card is communicating with a contactless reader; the node 69 on which is provided the current I_LED; the transistors 82 and 84, coupled, as described in relation with FIG. 4, to the nodes 38, 40 and 80; and the resistor 86 and the transistor 88.

The circuit 64 differs from the circuit 64 of FIG. 4 in that circuit 64 of FIG. 5 is configured to be calibrated, for example according the elements LED1 and LED2.

In the example of FIG. 5, the assembly of the resistor 86 and the transistor 88 are coupled between the node 80 and a node 92. In other words, a terminal of the resistor 86 is coupled, preferably connected, to the node 80 and another terminal of the resistance 86 Is coupled, preferably connected, to the node 90. A terminal of the transistor 88, for example the source, is coupled, preferably connected, to the node 90 and another terminal of the transistor 88, for example the drain, is coupled, preferably connected, to the node 92. The transistor 88 is, as in FIG. 4, controlled by a control voltage Vgsink. A control terminal, for example the gate, of the transistor 88 is therefore coupled, preferably connected, to a node 94 of application of the voltage Vgsink.

The circuit 64 comprises at least one assembly 96 comprising a resistor 98, a transistor 100 and a switch 102. In the example of FIG. 5, the circuit 64 comprises three assemblies 96. For example, all the resistor 98 are identical. For example, all transistors 100 are identical.

The resistor 98, the transistor 100 and the switch 102 of each assembly 96 are coupled in series between the node 80 and the node 92. The assemblies 96 are therefore coupled in parallel with each other and with the assembly of the resistor 86 and the transistor 88. In other words, a terminal of the resistor 98 of each assembly 93 is coupled, preferably connected, to the node 80 and another terminal of the resistor 98 is coupled, preferably connected, to a node 104 of the assembly. The nodes 104 of the different assemblies are distinct. A terminal of the transistor 100, for example the source, is coupled, preferably connected, to the node 104 and another terminal of the transistor 100, for example the drain, is coupled, preferably connected, to a node 106 of the assembly. The nodes 106 of the different assemblies are distinct. The transistors 100 are, for example, controlled by the same control voltage Vgsink as the transistor 88. A control terminal, for example the gate, of each transistor 100 is therefore coupled, preferably connected, to the node 94 of application of the voltage Vgsink. A terminal of the switch 102 of the assembly is coupled, preferably connected, to the node 106 and another terminal of the switch 102 is coupled, preferably connected, to the node 92. Each switch 102 is configured to be controlled by a bit of a binary word CAL. The word CAL therefore comprises as many bits as there is assemblies 96 in the circuit 64, each switch 102 being controlled by a different bit of the word CAL. More precisely, if the bit corresponding to a switch 102 has a first binary value, for example the value '1', the switch 102 is on and if the bit corresponding to the switch 102 has a second binary value, for example the value '0', the switch 102 is off. In the example of FIG. 5, the circuit 64 comprises three assemblies 96. The word CAL is a word of three bits.

The circuit 64 further comprises a commuting (switching) element 108. The commuting element 108 comprises an input terminal 110. The input terminal 110 is coupled, preferably connected, to the node 92. The commuting element 108 comprises two output terminals 112 and 114. The terminal 112 is coupled, preferably connected, to the node 69. The terminal 114 is coupled, preferably connected, to an input node of a calibration comparator 116. The commuting element is controlled by a signal EN_CAL. The signal EN_CAL is, for example, a binary signal. The signal EN_CAL is, for example, configured to take a first value, for example the value '1', when the circuit 64 is in a calibration mode and a second value, for example the value '0', when the circuit 64 is in a standard operating mode. When the signal EN_CAL takes the first value, the commuting element 108 is configured to connect the input terminal 110 to the terminal 114. When the signal EN_CAL takes the second value, the commuting element 108 is configured to connect the input terminal 110 to the terminal 112.

The value of the current I_LED can vary, either between similar cards because of variation during the manufacturing process, or during the life of the card because of variation in the temperature, in the limiter voltage, in the voltage Vgsink, or in the parameters of the transistors. In order to ensure an optimal value of the current I_LED, the circuit 64 is configured to calibrate the value of the current I_LED.

In order to implement this calibration, the circuit 64 comprises the calibration comparator 116. The comparator 116 is configured to receive the signal EN_CAL, indicating if the circuit 64 is in a calibration mode. The comparator 116 is also configured to receive a signal CAL_LEV. The signal CAL_LEV is configured to indicate the trimming value. The comparator 116 is also configured to receive a signal I_REF, indicating a reference current value. The comparator 116 is also configured to receive the current I_LED through the commuting element 108 in calibration mode.

The calibration is, for example, an automatic calibration. When the circuit 64 is in calibration mode, in other words when the signal EN_CAL takes the first value, for example before each enabling of one of the elements LED1 or LED2, the comparator 116 receives the current I_LED generated by the circuit 64 and compare the current I_LED to the reference current value I_REF. The comparator 116 generates a signal CAL_COMP on an output node 118. The signal CAL_COMP is indicative of the result of the comparison between the current I_LED and the value I_REF.

The signal CAL_COMP is provided to an element 120. In other words, the element 120 comprises an input node coupled, preferably connected, to the output node 118. The element 120 is, for example, a state machine. The element 120 is configured to determine, based on the signal CAL-_COMP, what modification must be made to the circuit 64 in order to generate the current I_LED at the chosen value. In other words, the element 120 generate the binary word CAL controlling the switches 102. In other words, the element 120 comprises an output node, on which is applied the signal CAL, coupled, preferably connected, to the control terminals of the switches 102.

Figure 6:
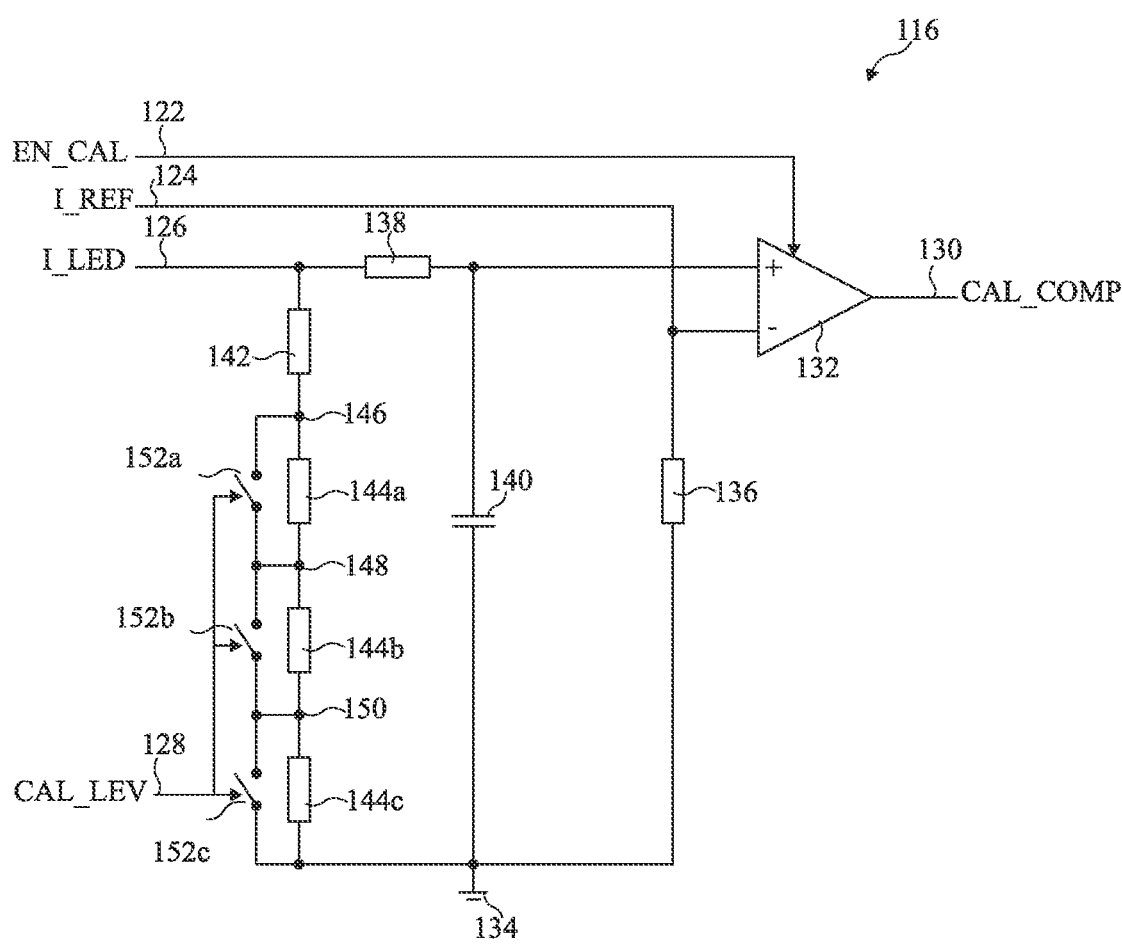
FIG. 6 illustrates a calibration comparator.

FIG. 6 illustrates a calibration comparator. More precisely, FIG. 6 illustrates an implementation of the calibration comparator 116 of FIG. 5.

The comparator 116 comprises: an input node 122 receiving the signal EN_CAL; an input node 124 receiving the signal I_REF; an input node 126 receiving the current I_LED; an input node 128 receiving the signal CAL_LEV; and an output node 130 on which is applied the signal CAL_COMP, corresponding to the node 118 of FIG. 5.

The comparator 116 comprises an amplifier 132, for example a differential amplifier. The amplifier 132 comprises an output configured to generate the signal CAL-_COMP. The output of the amplifier 132 is coupled, preferably connected, to the node 130. The amplifier also comprises a first input, for example a negative input (–) and a second input, for example a positive input (+).

The first input of the amplifier 132 is coupled, preferably connected, to the node 124. The first input of the amplifier 132 is also coupled to a node 134 of application of a reference voltage, for example the ground GND. The first input of the amplifier 132 is coupled to the node 134 by a resistor 136. In other words, a terminal of the resistance 136 is coupled, preferably connected, to the first input of the amplifier 132 and another terminal of the resistance 136 is coupled, preferably connected, to the node 134.

The second input of the amplifier 132 is coupled to the node 126 by a resistor 138. In other words, a terminal of the resistance 138 is coupled, preferably connected, to the second input of the amplifier 132 and another terminal of the resistance 138 is coupled, preferably connected, to the node 126. The second input of the amplifier 132 is also coupled to the node 134 by a capacitor 140. In other words, a terminal of the capacitor 140 is coupled, preferably connected, to the second input of the amplifier 132 and another terminal of the capacitor 140 is coupled, preferably connected, to the node 134.

The amplifier 132 is controlled by the signal EN_CAL. In other words, the amplifier comprises an input coupled, preferably connected, to the node 122. When the signal EN_CAL takes the first value, the circuit 64 of FIG. 5 is in calibration mode and the amplifier is enabled. In other words, when the signal EN_CAL takes the first value, the output signal CAL_COMP of the amplifier depends on the result of the comparison of the currents I_LED and I_REF. When the signal EN_CAL takes the second value, the output signal CAL_COMP is independent of the result of the comparison of the currents I_LED and I_REF, and is for example constant, for example substantially equal to zero.

The comparator comprises a resistor 142 and at least one resistor 144 coupled in series between the node 126 and the node 134. In the example of FIG. 6, the comparator 116 comprises three resistors 144 referenced 144a, 144b and 144c. A terminal of the resistor 142 is coupled, preferably connected, to the node 126 and another terminal of the resistor 142 is coupled, preferably connected, to a node 146. A terminal of the resistor 144a is coupled, preferably connected, to the node 146 and another terminal of the resistor 144a is coupled, preferably connected, to a node 148. A terminal of the resistor 144b is coupled, preferably connected, to the node 148 and another terminal of the resistor 144b is coupled, preferably connected, to a node 150. A terminal of the resistor 144c is coupled, preferably connected, to the node 150 and another terminal of the resistor 144c is coupled, preferably connected, to the node 134.

The comparator 116 further comprises switches 152. The comparator comprises as many switches 152 as resistors 144. In the example of FIG. 6, the comparator comprises three switches 152 referenced 152a, 152b, and 152c. Each switch 152 is coupled in parallel with one, preferably only one, of the resistors 144. Each resistor 144 is coupled in parallel with one, preferably only one, of the switches 152. In the example of FIG. 6, the switch 152a is coupled in parallel with the resistor 144a, the switch 152b is coupled in parallel with the resistor 144b, and the switch 152c is coupled in parallel with the resistor 144c. In other words, a terminal of the switch 152a is coupled, preferably connected, to the node 146 and another terminal of the switch 152a is coupled, preferably connected, to the node 148. A terminal of the switch 152b is coupled, preferably connected, to the node 148 and another terminal of the switch 152b is coupled, preferably connected, to the node 150. A terminal of the switch 152c is coupled, preferably connected, to the node 150 and another terminal of the switch 152c is coupled, preferably connected, to the node 134.

The switches 152 are controlled by the binary word CAL_LEV. The binary word CAL_LEV comprises, for example, as many bits as there are switches 152. In the example of FIG. 6, the word CAL_LEV comprises three bits, one of which is configured to control the switch 152a, one of which is configured to control the switch 152b, and one of which is configured to control the switch 152c. Preferably, the switches 152 are controlled by different bits of the word CAL_LEV. The resistance between the node 126 and the node 134, defining the trimming value, is therefore dependent on the value of the word CAL_LEV.

Figure 7:
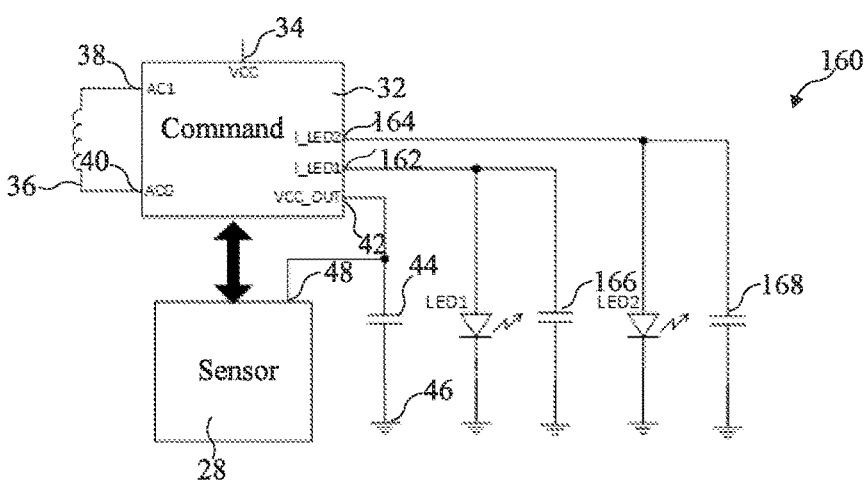
FIG. 7 illustrates another embodiment of a circuit of the device of FIG. 1.

FIG. 7 illustrates another embodiment of a circuit of the device of FIG. 1. More precisely, FIG. 7 illustrates an embodiment of a circuit 160 of the card 12. The circuit 160 is an alternative to the circuit 30 of FIG. 2.

The circuit 160 comprises several elements of the circuit 30 of FIG. 3. Those elements will not be described in detail again. In particular, the circuit 160 comprises the circuit 32, having the node 34 of application of the voltage VCC, the node 42 of application of the voltage VCC_OUT, and the nodes 38, 40 of application of the potentials AC0 and AC1. The circuit 160 also comprises the antenna 36, coupled to the nodes 38 and 40. The circuit 160 also comprises the capacitor 44 coupled between the node 42 and the node 46 of application of the reference voltage, for example GND. The circuit 160 also comprises the fingerprint sensor 28, having a node 48 coupled to the node 42. The circuit 160 also comprises the light emitting elements LED1, LED2.

The circuit 160 differs from the circuit 30 of FIG. 2 in that the circuit 32, in other words the secure controller, has enough computing power to process the data generated by the fingerprint sensor 28. Therefore, the circuit 160 does not comprise the circuit 50, separate from the circuit 32, configured to process the data generated by the sensor 28. The circuit 32 is configured to generate the currents crossing the elements LED1 and LED2 and to enable the elements LED1 and LED2. More precisely, the circuit 32 comprises an output node 162 and an output node 164. The circuit 32 is configured to generate a current I_LED1 through the node 162 and a current I_LED2 through the node 164.

The diode LED1 is coupled between the node 162 and the node 46. In other words, a terminal, for example the cathode, is coupled, preferably connected, to the node 46 and another terminal of the diode LED1, for example the anode, is coupled, preferably connected, to the node 162. The current I_LED1 is configured to cross the diode LED1.

The diode LED2 is coupled between the node 164 and the node 46. In other words, a terminal, for example the cathode, is coupled, preferably connected, to the node 46 and another terminal of the diode LED2, for example the anode, is coupled, preferably connected, to the node 164. The current I_LED2 is configured to cross the diode LED2.

The circuit 160 differs from the circuit 30 of FIG. 2 in that the circuit 160 does not comprise the capacitor 60 but comprises capacitors 166 and 168. The capacitor 166 is coupled in parallel with the diode LED1 and the capacitor 168 is coupled in parallel with the diode LED2. In other words, a terminal of the capacitor 166 is coupled, preferably connected, to the node 162 and another terminal of the capacitor 166 is coupled, preferably connected, to the node 46. Similarly, a terminal of the capacitor 168 is coupled, preferably connected, to the node 164 and another terminal of the capacitor 168 is coupled, preferably connected, to the node 46.

For example, the circuit 160 is configured to generate the same current I_LED as the circuit 30, which is applied on the node 162 or 164, depending on the diode to enable.

Figure 8:
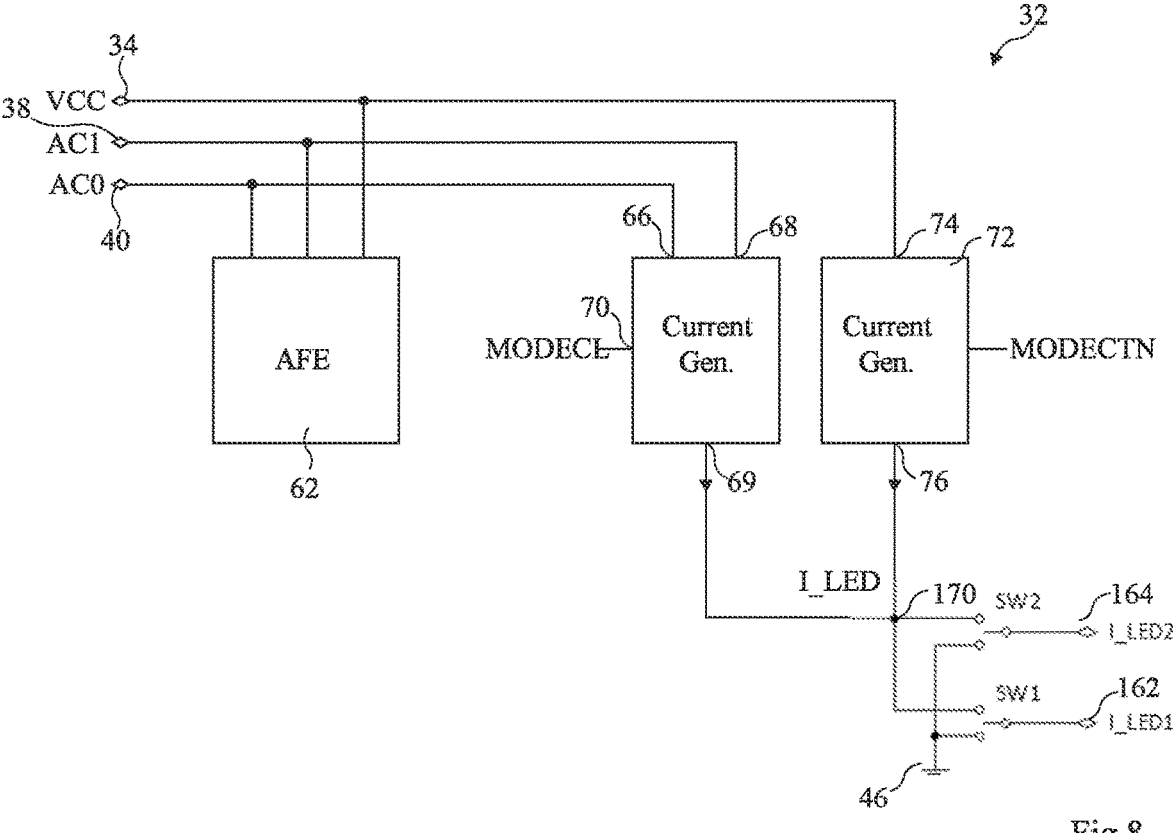
FIG. 8 illustrates an example of implementation of the circuit in the embodiment of FIG. 7.

FIG. 8 illustrates an example of implementation of the circuit 32 in the embodiment of FIG. 7.

The circuit 32 comprises several elements of the circuit 32 of FIG. 3. Those elements will not be described in detail again. In particular, the circuit 32 comprises the nodes 34, 38,40, the analog front end circuit 62, the circuit 64 of generation of the current I_LED when the card is powered in a contactless manner, and the circuit 72 of generation of the current I_LED when the card is powered in a contact manner.

The circuits 64 and 72 are configured to generate the current I_LED on a node 170. The nodes 69 and 76 are both coupled, preferably connected, to the node 170.

The circuit 32 comprises the output nodes 162 and 164 of application of the currents I_LED1 and I_LED_2.

The circuit 32 comprises commuting (switching) elements SW1 and SW2. The commuting element SW1 comprises an output node coupled, preferably connected, to the node 162, an input node coupled, preferably connected, to the node 170 and an input node coupled, preferably connected, to the node 46. Similarly, the commuting element SW2 comprises an output node coupled, preferably connected, to the node 164, an input node coupled, preferably connected, to the node 170 and an input node coupled, preferably connected, to the node 46. The current I_LED can be provided on the node 162 or the node 164 through the commuting elements SW1 and SW2.

Figure 9:
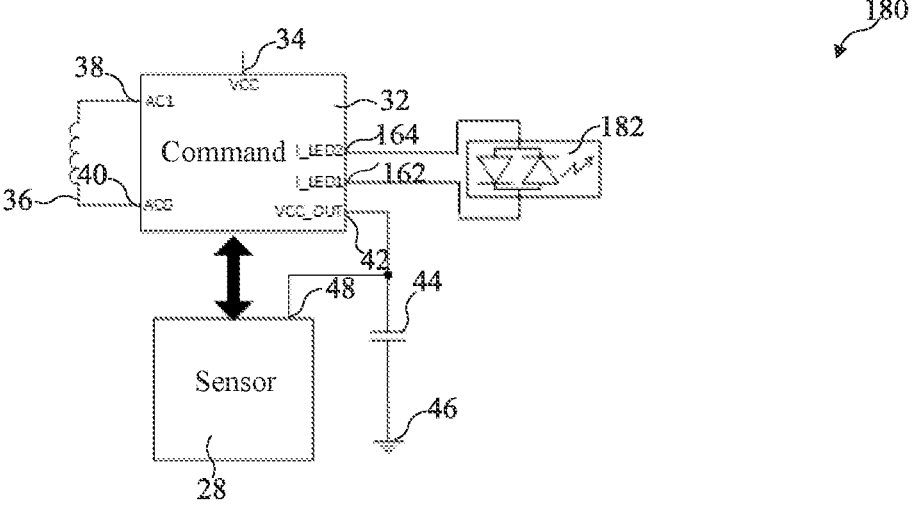
FIG. 9 illustrates another embodiment of a circuit of the device of FIG. 1.

FIG. 9 illustrates another embodiment of a circuit of the device of FIG. 1. More precisely, FIG. 9 illustrates an embodiment of a circuit 180 of the card 12. The circuit 180 is an alternative to the circuit 160 of FIG. 7.

The circuit 180 comprises several elements of the circuit 160 of FIG. 7. Those elements will not be described in detail again. In particular, the circuit 180 comprises the circuit 32, having the node 34 of application of the voltage VCC, the node 42 of application of the voltage VCC_OUT, the nodes 38, 40 of application of the potentials AC0 and AC1, and the nodes 162 and 164 of application of the currents I_LED1 and I_LED2. The circuit 160 also comprises the antenna 36, coupled to the nodes 38 and 40. The circuit 160 also comprises the capacitor 44 coupled between the node 42 and the node 46 of application of the reference voltage, for example GND. The circuit also comprises the fingerprint sensor 28, having a node 48 coupled to the node 42.

The circuit 180 differs from the circuit 160 in that the circuit 180 does not comprise two light emitting elements LED1 and LED2, but a light emitting element 182. The light emitting element 182 is a bicolor light emitting diode. In bicolor light emitting diodes, a first and a second light emitting diodes are assembled in parallel with inversed directions. In other words, the light emitting element 182 comprises a first terminal coupled, preferably connected, to the cathode of the first diode and to the anode of the second diode and a second terminal coupled, preferably connected, to the anode of the first diode and to the cathode of the second diode. The first terminal is also coupled, preferably connected, to the node 162 and the second terminal is also coupled, preferably connected, to the node 164. The light emitting element, among the first and second diodes, which is emitting is defined by the direction of the current between the nodes 162 and 164.

An example of the circuit 32 of FIG. 9 is described in relation with FIG. 8. In this example, the first diode of the element 182 is enabled by connecting the node 162 to the node 170 and connecting the node 164 to the node 46. Similarly, the second diode of the element 182 is enabled by connecting the node 164 to the node 170 and connecting the node 162 to the node 46.

An advantage of the embodiment described is that it is possible to generate the current of the light emitting elements independently from the voltage powering the other elements of the card. In particular, it is possible to generate the current of the light emitting elements without disturbing the transmission of information between the card and the reader.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

The invention claimed is:

1. A device, comprising:
a command circuit configured, in connection with device operation in a first mode of operation, to receive a first supply voltage in a contactless manner;
a light emitting element;
a first circuit configured to receive a second supply voltage that is generated from the first supply voltage;
wherein the light emitting element is configured to receive a first current that is generated from the first supply voltage and independent from the second supply voltage and is selectively turned on; and
a calibration circuit configured to implement a calibration operation before each selective turning on of the light emitting element.

2. The device according to claim 1, wherein the light emitting element is a light emitting diode.

3. The device according to claim 1, wherein the first circuit is an authentication circuit, and wherein the light emitting element, when selectively turned on, indicates the result of an authentication performed by the authentication circuit.

4. The device according to claim 1, wherein the first circuit is a fingerprint sensor.

5. The device according to claim 1, further comprising an antenna coupled to the command circuit and wherein the first supply voltage is received from the antenna.

6. The device according to claim 1, wherein the command circuit includes a second circuit implemented as an integrated circuit and configured to generate the second supply voltage on a first pin of the integrated circuit and a third circuit configured to generate the first current on a second pin of the integrated circuit.

7. The device according to claim 6, further comprising a capacitor coupled between the first pin and a node of application of a reference voltage.

8. The device according to claim 6, further comprising a fourth circuit configured to generate a control voltage for the light emitting element, the light emitting element being coupled between an output of the fourth circuit and the second pin.

9. The device according to claim 6, wherein the third circuit comprises: a rectifier coupled between a first node of application of the first supply voltage and a second node; a first resistance; and a first transistor coupled in series between the second node and the second pin.

10. The device according to claim 9, further comprising at least one assembly of a second resistance, a second transistor and a switch coupled in series, the at least one assembly being coupled in parallel with the first resistance and the first transistor, wherein the switch of the at least one assembly is controlled by a calibration signal.

11. The device according to claim 10, further comprising a fifth circuit configured to generate the calibration signal based on a comparison of the first current and a reference current.

12. The device according to claim 1, wherein said calibration operation comprises generating a calibration signal based on a comparison of the first current and a reference current.

13. The device according to claim 12, further comprising at least one assembly of a resistance, a transistor and a switch coupled in series, the at least one assembly being coupled to the second pin, wherein the switch of the at least one assembly is controlled by said calibration signal.

14. The device according to claim 12, wherein the device is configured to operate in a second mode of operation during which the device is configured to receive a third supply voltage through a contact.

15. The device according to claim 14, wherein the device comprises a fourth circuit configured to generate the calibration signal based on the comparison of the first current and a reference current.

16. A device, comprising:
a command circuit configured, in connection with device operation in a first mode of operation, to receive a first supply voltage in a contactless manner;
a light emitting element; and
a first circuit configured to receive a second supply voltage that is generated from the first supply voltage;
wherein the light emitting element is configured to receive a first current that is generated from the first supply voltage and independent from the second supply voltage and is selectively turned on;
wherein the command circuit includes a second circuit implemented as an integrated circuit and configured to generate the second supply voltage on a first pin of the integrated circuit and a third circuit configured to generate the first current on a second pin of the integrated circuit; and
wherein the third circuit comprises: a rectifier coupled between a first node of application of the first supply voltage and a second node; a first resistance; and a first transistor coupled in series between the second node and the second pin.

17. The device according to claim 16, further comprising at least one assembly of a second resistance, a second transistor and a switch coupled in series, the at least one assembly being coupled in parallel with the first resistance and the first transistor, wherein the switch of the at least one assembly is controlled by a calibration signal.

18. The device according to claim 17, further comprising a fifth circuit configured to generate the calibration signal based on a comparison of the first current and a reference current.

19. The device according to claim 18, wherein the calibration signal is selected to ensure that the first current is equal to the reference current.

20. The device according to claim 16, wherein the light emitting element is a light emitting diode, and further comprising an antenna coupled to the command circuit and wherein the first supply voltage is received from the antenna.

21. The device according to claim 16, wherein the first circuit is an authentication circuit, and wherein the light emitting element, when selectively turned on, indicates the result of an authentication performed by the authentication circuit.

22. The device according to claim 16, wherein the first circuit is a fingerprint sensor.

23. A device, comprising:

a command circuit configured, in connection with device operation in a first mode of operation, to receive a first supply voltage in a contactless manner;

a light emitting element;

a first circuit configured to receive a second supply voltage that is generated from the first supply voltage;

wherein the light emitting element is configured to receive a first current that is generated from the first supply voltage and independent from the second supply voltage and is selectively turned on;

wherein the command circuit includes a second circuit implemented as an integrated circuit and configured to generate the second supply voltage on a first pin of the integrated circuit and a third circuit configured to generate the first current on a second pin of the integrated circuit; and a fourth circuit configured to generate a control voltage for the light emitting element, the light emitting element being coupled between an output of the fourth circuit and the second pin.

24. The device according to claim 23, wherein the light emitting element is a light emitting diode, and further comprising an antenna coupled to the command circuit and wherein the first supply voltage is received from the antenna.

25. The device according to claim 23, wherein the first circuit is an authentication circuit, and wherein the light emitting element, when selectively turned on, indicates the result of an authentication performed by the authentication circuit.

26. The device according to claim 23, wherein the first circuit is a fingerprint sensor.

27. The device according to claim 23, further comprising a capacitor coupled between the first pin and a node of application of a reference voltage.

* * * * *